US011979725B2

(12) United States Patent
Zhu et al.

(10) Patent No.: US 11,979,725 B2
(45) Date of Patent: May 7, 2024

(54) VIBRATION SOUND DEVICE FOR ELECTRONIC PRODUCT AND ELECTRONIC PRODUCT

(71) Applicant: GOERTEK INC., Shandong (CN)

(72) Inventors: Yueguang Zhu, Shandong (CN); Dongsheng Mao, Shandong (CN); Dezhang Shi, Shandong (CN); Yongqiang Wang, Shandong (CN)

(73) Assignee: GOERTEK INC., Weifang (CN)

( * ) Notice: Subject to any disclaimer, the term of this patent is extended or adjusted under 35 U.S.C. 154(b) by 159 days.

(21) Appl. No.: 17/781,802

(22) PCT Filed: Jun. 30, 2020

(86) PCT No.: PCT/CN2020/099535
§ 371 (c)(1),
(2) Date: Jun. 2, 2022

(87) PCT Pub. No.: WO2021/109560
PCT Pub. Date: Jun. 10, 2021

(65) Prior Publication Data

US 2023/0007401 A1 Jan. 5, 2023

(30) Foreign Application Priority Data

Dec. 2, 2019 (CN) ......................... 201911214857.2

(51) Int. Cl.
*H04R 9/00* (2006.01)
*H04R 1/02* (2006.01)
*H04R 9/02* (2006.01)

(52) U.S. Cl.
CPC ............... *H04R 9/025* (2013.01); *H04R 1/02* (2013.01)

(58) Field of Classification Search
CPC .............. H04R 9/025; H04R 2209/024; H04R 2440/00; H04R 2440/01; H04R 2440/03;
(Continued)

(56) References Cited

U.S. PATENT DOCUMENTS 2,105,296 A * 1/1938 Pearson ............... H04R 25/502 330/199
2,610,259 A * 9/1952 Roberton ............... H04R 11/00 381/417
(Continued)

FOREIGN PATENT DOCUMENTS

CN 205792142 U 12/2016
CN 108966093 A 12/2018
(Continued)

OTHER PUBLICATIONS

International Search Report from International Application No. PCT/CN2020/099535 dated Oct. 9, 2020.

*Primary Examiner* — Ryan Robinson
(74) *Attorney, Agent, or Firm* — Shih IP Law Group, PLLC

(57) ABSTRACT

Disclosed are a vibration sound device for an electronic product and the electronic product. The vibration sound device comprises a first housing, a magnetic assembly, a coil assembly and a second housing. The first housing includes a cavity and is opened at one side thereof. An interaction force is generated between the magnetic assembly in the first housing and the coil assembly on the second housing to drive the vibration sound device to vibrate and sound. According to the present disclosure, the magnetic assembly and the coil assembly are configured into a nested form, so that the overall height of the vibration sound device is reduced, the space utilization rate and the assembly precision are improved, and enough utilization space is provided for an electronic device.

11 Claims, 5 Drawing Sheets

(58) Field of Classification Search
CPC ............ H04R 2440/05; H04R 2440/07; H04R 2499/11; H02K 33/18
See application file for complete search history.

(56) References Cited

U.S. PATENT DOCUMENTS

| | | | | |
|---|---|---|---|---|
| 6,931,140 | B2 * | 8/2005 | Van Halteren | H04R 9/063<br>181/173 |
| 7,062,063 | B2 * | 6/2006 | Hansen | H04R 9/047<br>381/431 |
| 8,542,862 | B2 * | 9/2013 | Meguro | H04R 7/045<br>381/396 |
| 9,591,407 | B2 * | 3/2017 | Guo | H04R 7/18 |
| 9,838,795 | B2 * | 12/2017 | Wang | H04R 7/127 |
| 2003/0103642 | A1 * | 6/2003 | Kam | H04R 9/043<br>381/431 |
| 2014/0072149 | A1 * | 3/2014 | Yan | H04R 7/045<br>381/162 |
| 2016/0226359 | A1 * | 8/2016 | Guo | H02K 33/16 |
| 2018/0146294 | A1 * | 5/2018 | Zhu | H04R 9/047 |
| 2018/0348816 | A1 | 12/2018 | Lee et al. | |
| 2023/0388715 | A1 * | 11/2023 | Soronen | H04R 13/00 |

FOREIGN PATENT DOCUMENTS

| | | | | |
|---|---|---|---|---|
| CN | 208821081 | U | 5/2019 | |
| CN | 110113696 | A | 8/2019 | |
| CN | 110933566 | A | 3/2020 | |
| CN | 111050252 | A | 4/2020 | |
| EP | 1703764 | A2 | 9/2006 | |
| WO | WO-2008038759 | A1 * | 4/2008 | H04R 9/025 |

* cited by examiner

VIBRATION SOUND DEVICE FOR ELECTRONIC PRODUCT AND ELECTRONIC PRODUCT

TECHNICAL FIELD

The present disclosure relates to a technical field of sound generating device, in particular to a vibration sound device for an electronic product and the electronic product.

BACKGROUND ART

With the advent of 5G Era, while pursuing the ultimate network experience, people's expectations for a truly full screen of electronic devices are also rising. However, how to realize the function of a receiver without an opening on the screen and have a better listening experience is a technical problem currently faced.

At present, in the prior art, the function of receiver realized without an opening on the screen mainly relies on an exciter. The existing exciter generally includes a basin frame, a magnet and a coil, has the advantages of simple structure, easy production and high development prospect and practical value, but the traditional exciter needs to consider the consistency between the resonant frequency of the exciter itself and the resonant frequency of electronic products, resulting in low sensitivity and poor listening experience.

SUMMARY OF THE INVENTION

An object of the present disclosure is to provide a vibration sound device for an electronic product and the electronic product.

According to a first aspect of the present disclosure, a vibration sound device for an electronic product is provided, including: a first housing, including a cavity and is opened at one side thereof; a magnetic assembly, the magnetic assembly comprises a first magnetic assembly and a second magnetic assembly, the first magnetic assembly comprises a first magnet and a third magnet, the second magnetic assembly comprises a second magnet and a fourth magnet, the first magnetic assembly and the second magnetic assembly are respectively disposed on opposite side walls of the first housing, a magnetization direction of the first magnet and a magnetization direction of the second magnet are the same and along respective arrangement directions thereof, a magnetization direction of the third magnet and a magnetization direction of the fourth magnet are the same and along respective arrangement directions thereof, the magnetization direction of the first magnet is opposite to the magnetization direction of the third magnet, and the first magnet, the second magnet, the third magnet and the fourth magnet constitute a closed magnetic circuit; a first channel formed between the first magnetic assembly and the second magnetic assembly; and a coil assembly and a second housing, the coil assembly is connected with the second housing and positioned in the first channel along a longitudinal direction thereof, wherein the second housing is movably connected to the magnetic assembly.

Optionally, the second housing further includes a plurality of elastic pieces, and the plurality of the elastic pieces are positioned corresponding to the magnetic assembly and bonded to the magnetic assembly.

Optionally, the elastic pieces are obliquely positioned on the second housing, an end of each of the elastic pieces close to the second housing is connected to the second housing, an end of each of the elastic pieces away from the second housing is disposed as in plane parallel to the second housing, and is connected with the magnetic assembly.

Optionally, a boss for supporting the coil assembly is provided on the second housing.

Optionally, the elastic piece and the second housing are bonded by welding or integrally formed.

Optionally, the first magnet, the second magnet, the third magnet and the fourth magnet of the magnetic assembly are symmetrically positioned with respect to the coil assembly.

Optionally, a distance between the third magnet and the first magnet is greater than a distance between the third magnet or the first magnet and the coil assembly.

Optionally, the magnetization directions of the first magnet and the second magnet are perpendicular to the radial direction of the coil assembly.

Optionally, wherein the vibration sound device further comprises a washer, the washer is disposed between the first housing and the magnetic assembly, and the magnetic assemblies on the same side wall of the first housing are connected by the washer.

According to a second aspect of the present disclosure, an electronic product is provided, including: a first surface and a second surface, wherein the first surface is adapted to vibrate and is connected to the electronic product; and the vibration sound device, wherein the first housing is disposed on the first surface, and the second housing is disposed on the second surface, or, the first housing is disposed on the second surface, and the second housing is disposed on the first surface, and wherein the vibration sound device is configured to drive the first surface to vibrate with respect to the second surface to sound.

Compared with the prior art, the present disclosure has the following technical effect:

The present disclosure discloses a vibration sound device for an electronic product and the electronic product, the vibration sound device includes a first housing, a magnetic assembly, a coil assembly and a second housing. In the present disclosure, the magnetic assembly and the coil assembly are configured into a sandwiched form, so that the overall height of the vibration sound device is reduced, the space utilization rate and the assembly precision are improved, and enough utilization space is provided for an electronic device.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the specification, illustrate embodiments of the present disclosure, and serve to explain the principle of the present disclosure together with the description thereof.

REFERENCE NUMERALS

100—vibration sound device; 1—first housing; 2—magnetic assembly; 21—first magnet; 22—second magnet; 23—third magnet; 24—fourth magnet; 3—coil assembly; 4—second housing; 41—elastic piece; 42—boss; 5—washer; 6—first through hole; 200—first surface; 300—second surface.

DETAILED DESCRIPTION OF THE EMBODIMENTS

Various exemplary embodiments of the present disclosure will now be described in detail with reference to the accompanying drawings. It should be noted that the relative arrangement of the components and steps, the numerical expressions and numerical values set forth in these embodiments do not limit the scope of the disclosure, unless otherwise specified.

The following description of at least one exemplary embodiment is merely illustrative in fact and is not intended to limit the disclosure, its applications or uses.

Techniques, methods, and apparatus known to those skilled in the relevant art may not be discussed in detail, but where appropriate, such techniques, methods, and apparatus should be considered part of the specification.

In all examples shown and discussed herein, any specific values should be interpreted as merely exemplary and not limiting. Accordingly, other examples of the exemplary embodiment may have different values.

It should be noted that similar numerals and letters represent similar items in the following drawings. Therefore, once an item is defined in a drawing, it does not need to be further discussed in subsequent drawings.

Figure 1:
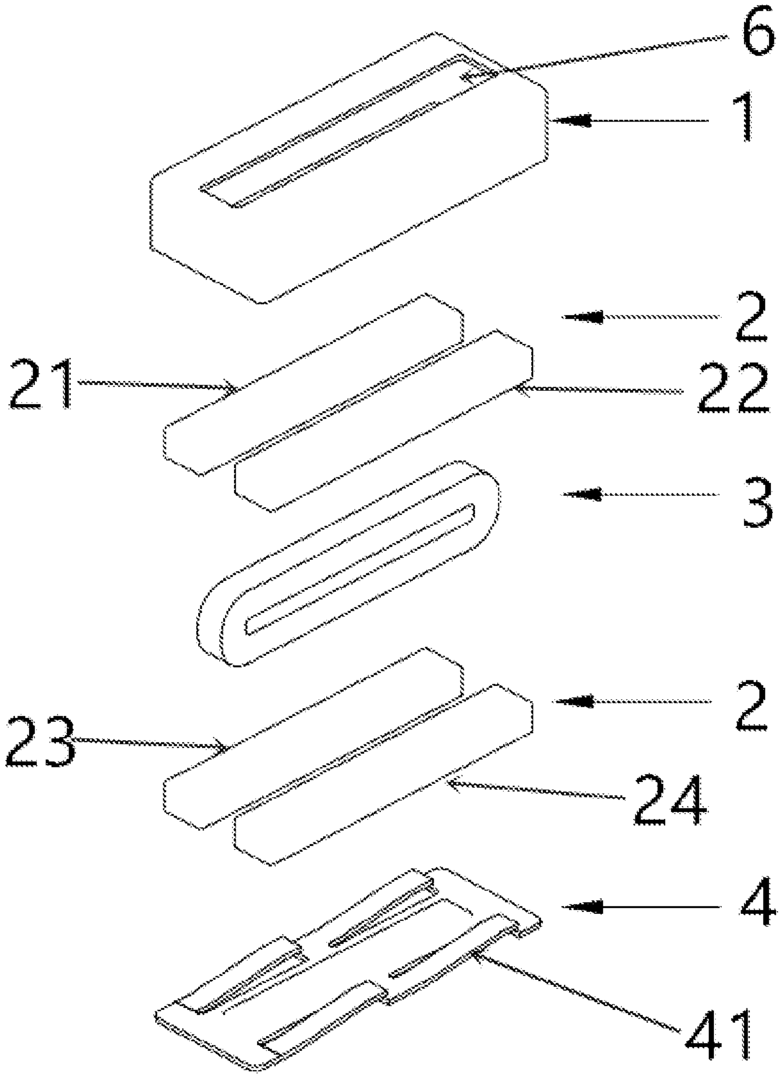
FIG. 1 is an exploded view of a vibration sound device according to the present disclosure.
Figure 2:
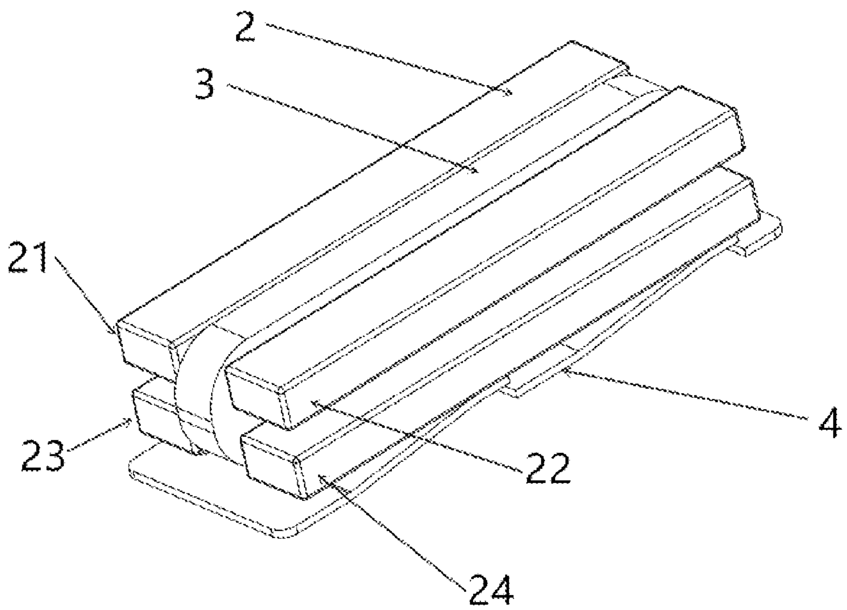
FIG. 2 is a schematic view illustrating a structure of a vibration sound device according to the present disclosure, from which a first housing is removed.

Referring to FIGS. 1 and 2, the present disclosure discloses a vibration sound device 100 for an electronic product, including a first housing 1, a magnetic assembly 2, a coil assembly 3 and a second housing 4, and the first housing 1 includes a cavity and is opened at one side thereof. The magnetic assembly 2 includes a first magnetic assembly and a second magnetic assembly, the first magnetic assembly includes a first magnet 21 and a third magnet 23, and the second magnetic assembly includes a second magnet 22 and a fourth magnet 24. The first magnetic assembly and the second magnetic assembly are respectively disposed on opposite side walls of the first housing 1. A magnetization direction of the first magnet 21 and a magnetization direction of the second magnet 22 are the same and along respective arrangement directions thereof, a magnetization direction of the third magnet 23 and a magnetization direction of the fourth magnet 24 are the same and along respective arrangement directions thereof. The magnetization direction of the first magnet 21 is opposite to the magnetization direction of the third magnet 23, and the first magnet 21, the second magnet 22, the third magnet 23 and the fourth magnet 24 constitute a closed magnetic circuit. A first channel is formed between the first magnetic assembly and the second magnetic assembly; and the coil assembly 3 is connected with the second housing 4 and positioned in the first channel along a longitudinal direction thereof, and the second housing 4 is movably connected to the magnetic assembly 2.

The magnetization directions of the first magnet 21 and the second magnet 22 are the same and along the arrangement direction thereof. The magnetic lines of the first magnet 21 and the second magnet 22 pass through the coil assembly 3 in the first channel, and thus an interaction force may be generated between the magnetic assembly 2 and the coil assembly 3. Similarly, the magnetization directions of the third magnet 23 and the fourth magnet 24 are the same and along the arrangement direction thereof, and the magnetization direction of the first magnet 21 is opposite to the magnetization direction of the third magnet 23. As such, the first magnet 21, the second magnet 22, the third magnet 23 and the fourth magnet 24 constitute a closed magnetic circuit, so as to drive the electronic product connected to the vibration sound device 100 to sound. In the present disclosure, the magnetic assembly 2 and the coil assembly 3 are configured in a sandwiched structure, so that the overall height of the vibration sound device 100 is reduced, and thus space utilization of the electronic device is improved.

Especially, the second housing 4 is movably connected to the magnetic assembly 2, which makes the vibration sound device 100 to be an integrated vibration sound device, and the integrated mechanism reduces the difficulty of the assembly process, the relative position between the first housing 1 covering the magnetic assembly 2 and the second housing 4 fixed and connected to the coil assembly 3, is ensured, and the assembly precision of the entire vibration sound device 100 is improved.

Figure 4:
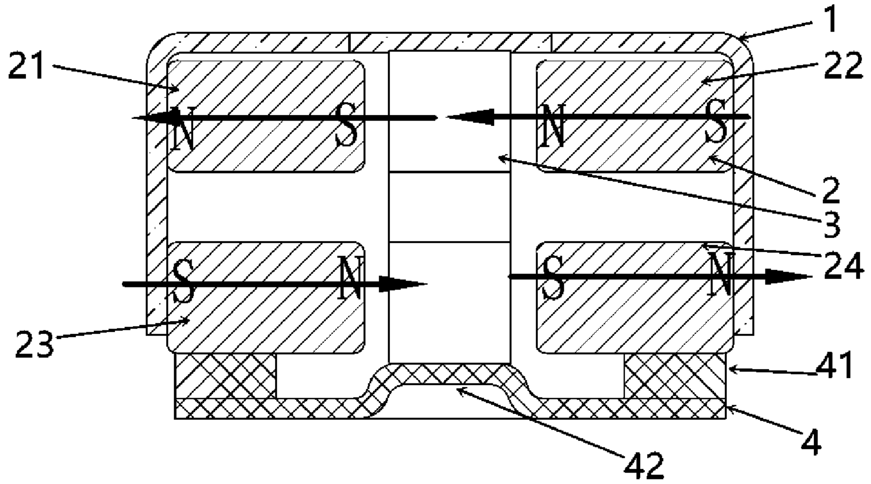
FIG. 4 is a cross-sectional view of a vibration sound device according to the present disclosure.

In a specific embodiment, referring to FIG. 4, the first magnet 21 and the second magnet 22 are symmetrically positioned at two sides of the coil assembly 3, and the magnetization directions of the first magnet 21 and the second magnet 22 are horizontal to the right, with N pole on the left and S pole on the right. The third magnet 23 and the fourth magnet 24 are symmetrically positioned at two sides of the coil assembly 3, the magnetization directions of the third magnet 23 and the fourth magnet 24 are toward the left of horizontal direction, with S pole on the left and N pole on the right. When a current is applied to the coil assembly 3, the coil assembly 3 may be subjected to a vertical downward or vertical upward force, and the forced direction is determined according to the current direction of the coil assembly 3, so that a sounding portion of the electronic product is driven to sound by the coil assembly 3. In addition, the magnitude and direction of vibration is changed according to the magnitude and direction of current, and thus the utilization efficiency of magnetic line is high and the power is strong, which provides better sound quality of the electronic product.

In the present disclosure, four magnetic circuits are configured by four magnets, and all of the four magnets are magnetized along their arrangement directions, and the magnetization direction of the third magnet 23 and the fourth magnet 24 is opposite to the magnetization direction of the first magnet 21 and the second magnet 22, so that the four magnetic circuits constitute a closed circuit by further providing a magnetic conductive member, a force between the magnetic assembly 2 and the coil assembly 3 is strong, and the magnetic circuit has a simple structure and thus it may be easily assembled.

In a specific embodiment, the coil assembly 3 may be a radial coil adhered to a surface of the second housing 4, and is positioned in the first channel between the first magnet 21 and the second magnet 22.

Figure 3:
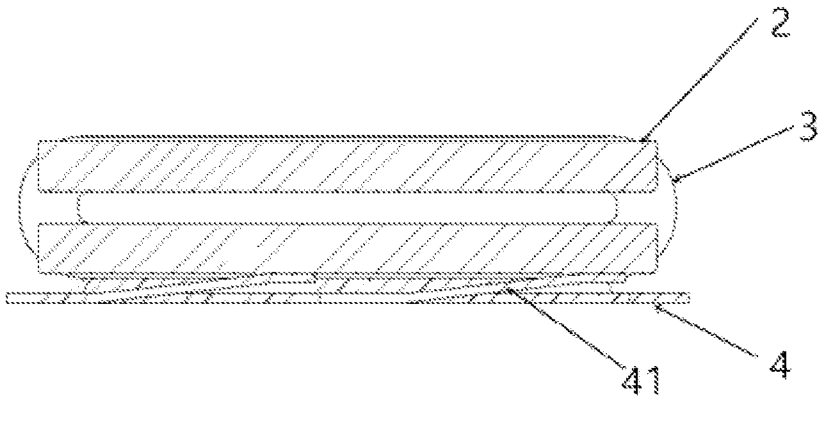
FIG. 3 is a side view of a vibration sound device according to the present disclosure.

Optionally, referring to FIGS. 1 and 3, the second housing 4 further includes a plurality of elastic pieces 41, and the plurality of the elastic pieces 41 are positioned corresponding to the magnetic assembly 2 and bonded to the magnetic assembly 2. The number of the elastic pieces 41 may be two, three, four or more, as long as the elastic pieces 41 may be well bonded to the magnetic assembly 2.

In a specific embodiment, the number of the elastic pieces 41 is two, which are respectively disposed under the magnetic assembly 2 on both sides of the first housing 1, the elastic pieces 41 are obliquely positioned on the second housing 4, an end of the elastic piece 41 close to the second housing 4 is connected to the second housing 4, an end of the elastic piece 41 away from the second housing 4 is disposed in a plane parallel to the second housing 4, and is connected with the magnetic assembly 2.

Optionally, a boss 42 for supporting the coil assembly 3 is provided on the second housing 4, the boss 42 may be Π-shaped or H-shaped, as long as it can support the coil assembly 3. Since a plurality of elastic pieces 41 are disposed on the second housing 4 having a certain height, so that the magnetic assembly 2 and the second housing are separated by a certain distance, and in order to ensure that the coil assembly 3 and the magnetic assembly 2 are positioned opposite each other, the second housing 4 is provided with a boss 42 supporting the coil assembly 3, the height of the boss 42 may be close to or the same as that of the elastic piece 41, so that it can be ensured that the coil assembly 3 and the magnetic assembly 2 have heights the same as or close to each other, and magnetic interaction between the magnetic assembly 2 and the coil assembly 3 may be more effective.

Optionally, the elastic piece 41 and the second housing 4 are bonded by welding or integrally formed. In a specific embodiment, in order to ensure the structural strength of the vibration sound device 100, both the elastic piece 41 and the second housing 4 may be made of metal materials with high strength, and their materials may be similar or the same, such that the elastic piece 41 and the second housing 4 may be connected by welding, which ensures the structural strength and improves the reliability of the connection.

In another specific embodiment, when the elastic piece 41 and the second housing 4 are made of the same material, the material may be the same metal or the same plastic, or composite material of several metals or several plastics. When the elastic piece 41 and the second housing 4 are made of the same material, they may be integrally formed, and accordingly, not only the connection strength between the elastic piece 41 and the second housing 4 may be increased, but also the production and assembly process of the vibration sound device 100 may be simplified.

Optionally, the elastic piece 41 and the magnetic assembly 2 are bonded by welding or bonded. In a specific embodiment, in order to ensure the integrated structural strength of the vibration sound device 100, the elastic piece 41 may be made of metal materials with high strength, such that the elastic piece 41 and the magnetic assembly 2 may be connected by welding, which ensures the structural strength and improves the reliability of the connection.

In addition, if it is inconvenient to weld between the elastic piece 41 and the magnetic assembly 2, for example, the elastic piece 41 is made of plastic material or a metal material that cannot be bonded by welding with the magnetic assembly 2, the elastic piece 41 and the magnetic assembly 2 may be connected by bonding, and the bonding method is easy to be processed and is low in cost.

Optionally, the first magnet 21, the second magnet 22, the third magnet 23 and the fourth magnet 24 of the magnetic assembly 2 are symmetrically positioned with respect to the coil assembly 3. Specifically, the first magnet 21 and the third magnet 23 are positioned symmetrically with the second magnet 22 and the fourth magnet 24 with respect to a longitudinal direction the coil assembly 3, and the first magnet 21 and the second magnet 22 are positioned symmetrically with the third magnet 23 and the fourth magnet 24 with respect to a latitudinal direction of the coil assembly 3, so that two rod-like magnets are positioned symmetrically in an up-down direction and two rod-like magnets are positioned symmetrically in left-right direction. Thereby the magnet e magnetic lines are perpendicular to the coil assembly 3 and are in a symmetrical state, the utilization rate of the magnetic line is high, and the force between the magnetic assembly 2 and the coil assembly 3 is stronger.

Figure 5:
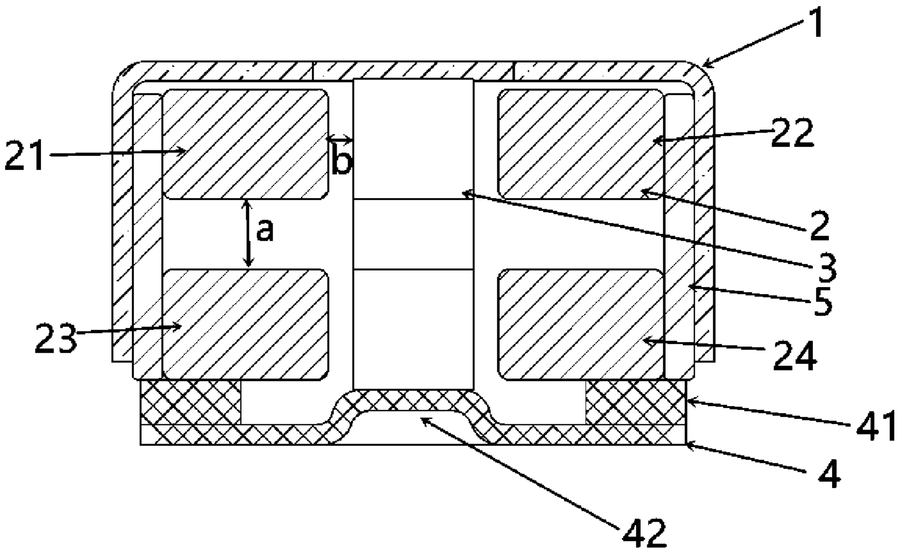
FIG. 5 is a cross-sectional view of another vibration sound device according to the present disclosure.

Optionally, referring to FIG. 5, a distance a between the third magnet 23 and the first magnet 21 is greater than a distance b between the third magnet 23 or the first magnet 21 and the coil assembly 3. As for the closed magnetic circuit composed of the first magnet 21 and the second magnet 22, the third magnet 23 and the fourth magnet 24, in case where a is greater than b, taking the first magnet 21 as an example, the force between the first magnet 21 and the coil assembly 3 is greater than the force between the first magnet 21 and the third magnet 23, and the magnetic lines generated by the first magnet 21 are easier to pass through the coil assembly 3 and a strong interaction force is generate between the first magnet 21 and the coil assembly 3, and the integrity and stability of the magnetic circuit may be ensured.

Optionally, the magnetization directions of the first magnet 21 and the second magnet 22 are perpendicular to the radial direction of the coil assembly 3. The first magnet 21 and the second magnet 22 are positioned at two sides of the coil assembly 3 and their magnetization directions are the same, so that the magnetic lines generated by the first magnet 21 and the second magnet 22 may pass through the coil assembly 3. In an embodiment, when the first magnet 21 and the second magnet 22 are located at upper portion and lower portion and one is above another, the magnetic lines of the first magnet 21 and the second magnet 22 may pass through the coil assembly 3 along the arrangement direction. In this case, the magnetic lines of the first magnet 21 and the second magnet 22 intersect with the coil assembly 3 but not perpendicular thereto, such that the utilization rate of the magnetic lines may be decreased. When the first magnet 21 and the second magnet 22 are located on the same horizontal plane, i.e., the magnetization direction of the first magnet 21 and the second magnet 22 is perpendicular to the radial direction of the coil assembly 3 along their arrangement direction. In this case, the magnetic lines of the first magnet 21 and the second magnet 22 may perpendicularly pass through the coil assembly 3, magnetic interaction between the magnetic assembly 2 and the coil assembly 3 may be more effective.

Optionally, the first housing 1 is made of a magnetic conductive material or a non-magnetic conductive material. In a specific embodiment, the first housing 1 is made of a magnetic conductive material, a magnetic conductive member may be disposed to connect the magnetic assemblies 2 on the same side to constitute a completed magnetic circuit together with the coil assembly 3 at the central position.

In another specific embodiment, the first housing 1 is made of a non-magnetic conductive material, the vibration sound device 100 further includes a washer 5, the washer 5 is disposed between the first housing 1 and the magnetic assembly 2, and the magnetic assemblies 2 on the same side wall of the first housing 1 are connected by the washer 5. The connection between the magnetic assemblies 2 on the same side through the washer 5 may avoid the entire first housing 1 being a magnetic conductive member, avoid the first housing 1 from enclosing the vibration sound device 100, so that the magnetic circuit is not disturbed by other magnetic conductive members, and thus the stability of the magnetic circuit may be improved.

Optionally, a first through hole 6 is disposed on a side of the first housing 1 away from the second housing 4, and the first through hole 6 is disposed opposite to the coil assembly 3. While the magnetic assembly 2 and the coil assembly 3 are configured in a sandwiched structure, which is accommodated in the first housing 1, a sufficient magnetic gap between the magnetic assembly 2 and the coil assembly 3 should be ensured, the first through hole 6 may be disposed so as to check the magnetic gap between the magnetic assembly 2 and the coil assembly 3 and a problem due to the gap can be recognized and adjusted in time, which improves the efficiency and service life of the vibration sound device 100.

Figure 6:
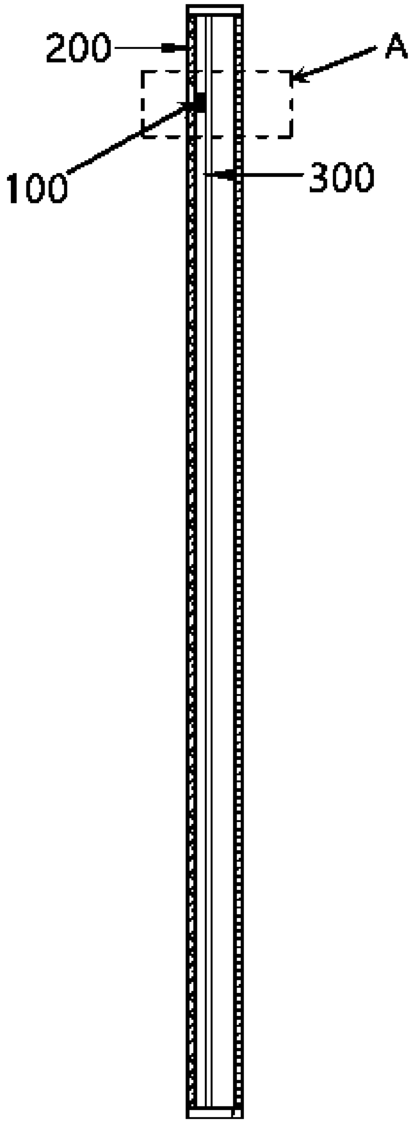
FIG. 6 is a schematic view illustrating a vibration sound device applied to an electronic product according to the present disclosure.

Referring to FIG. 6, the present disclosure also discloses an electronic product, including: a first surface 200 and a second surface 300, the first surface 200 is adapted to vibrate and is connected to the electronic product; and the vibration sound device 100. The first housing 1 of the vibration sound device 100 is disposed on the first surface 200, and the second housing 4 of the vibration sound device 100 is disposed on the second surface 300. Or, the first housing 1 of the vibration sound device 100 is disposed on the second surface 300, and the second housing 4 of the vibration sound device 100 is disposed on the first surface 200. The vibration sound device 100 is configured to drive the first surface 200 to vibrate with respect to the second surface 300 to sound, so that the electronic product with good sound quality may be ensured.

Specifically, the first housing 1 may be adhered to a surface of the first surface 200, or embedded inside the first surface 200, as long as a sufficient connection strength can be ensured.

Specifically, the first surface 200 may be a screen of the electronic product, and the second surface 300 may be a middle frame or a PCB board of the electronic product.

Optionally, the electronic product includes one of a mobile phone, a tablet computer, an e-book reader, an MP3 player, an MP4 player, a computer, a set-top box, a smart TV, and a wearable device.

Figure 7:
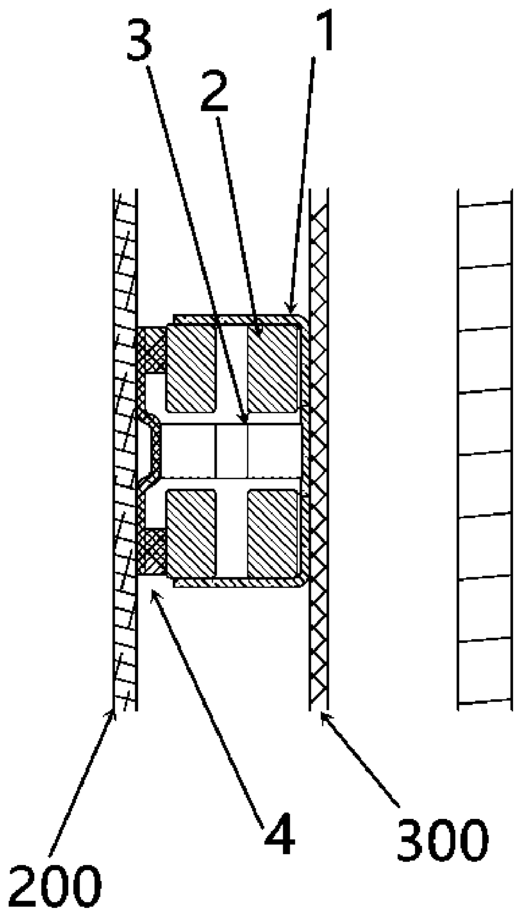
FIG. 7 is an enlarged view of A portion in FIG. 6 according to the present disclosure.

Referring to FIG. 7, in an embodiment of the present disclosure, the vibration sound device 100 is applied to an electronic product, wherein the first housing 1 of the vibration sound device 100 is disposed on the second surface 300, the second housing 4 of the vibration sound device 100 is disposed on the first surface 200, a strong interaction force is generated between the magnetic assembly 2 in the first housing 1 and the coil assembly 3 in the second housing 4, and directly drives the first surface 200 to vibrate and sound through the second housing 4.

Although some specific embodiments of the present disclosure have been described in detail by way of examples, those skilled in the art should understand that the above examples are provided for illustration only and are not intended to limit the scope of the present disclosure. Those skilled in the art will appreciate that modifications may be made to the above embodiments without departing from the scope and spirit of the present disclosure. The scope of the present disclosure is defined by the appended claims.

What is claimed is:

1. A vibration sound device for an electronic product, comprising:

a first housing, including a cavity and is opened at one side thereof;

a magnetic assembly, the magnetic assembly comprises a first magnetic assembly and a second magnetic assembly, the first magnetic assembly comprises a first magnet and a third magnet, the second magnetic assembly comprises a second magnet and a fourth magnet, the first magnetic assembly and the second magnetic assembly are respectively disposed on opposite side walls of the first housing, a magnetization direction of the first magnet and a magnetization direction of the second magnet are the same and along respective arrangement directions thereof, a magnetization direction of the third magnet and a magnetization direction of the fourth magnet are the same and along respective arrangement directions thereof, the magnetization direction of the first magnet is opposite to the magnetization direction of the third magnet, and the first magnet, the second magnet, the third magnet and the fourth magnet constitute a closed magnetic circuit;

a first channel formed between the first magnetic assembly and the second magnetic assembly; and a coil assembly and a second housing, the coil assembly is connected with the second housing and positioned in the first channel along a longitudinal direction thereof, wherein the second housing is movably connected to the magnetic assembly.

2. The vibration sound device of claim 1, wherein the second housing further comprises a plurality of elastic pieces, and the plurality of the elastic pieces are positioned corresponding to the magnetic assembly and bonded to the magnetic assembly.

3. The vibration sound device of claim 2, wherein the elastic pieces are obliquely positioned on the second housing, an end of each of the elastic pieces close to the second housing is connected to the second housing, an end of each of the elastic pieces away from the second housing is disposed in a plane parallel to the second housing, and is connected with the magnetic assembly.

4. The vibration sound device of claim 2, wherein a boss for supporting the coil assembly is provided on the second housing.

5. The vibration sound device of claim 2, wherein the elastic piece and the second housing are bonded by welding or integrally formed.

6. The vibration sound device of claim 1, wherein the first magnet, the second magnet, the third magnet and the fourth magnet of the magnetic assembly are symmetrically positioned with respect to the coil assembly.

7. The vibration sound device of claim 6, wherein a distance between the third magnet and the first magnet is greater than a distance between the third magnet or the first magnet and the coil assembly.

8. The vibration sound device of claim 1, wherein the magnetization directions of the first magnet and the second magnet are perpendicular to a radial direction of the coil assembly.

9. The vibration sound device of claim 7, wherein the vibration sound device further comprises a washer, the washer is disposed between the first housing and the magnetic assembly, and the magnetic assemblies on the same side wall of the first housing are connected by the washer.

10. An electronic product, comprising:

a first surface and a second surface, wherein the first surface is adapted to vibrate and is connected to the electronic product; and the vibration sound device of claim 1, wherein the first housing is disposed on the first surface, and the second housing is disposed on the second surface, or, the first housing is disposed on the second surface, and the second housing is disposed on the first surface, and wherein the vibration sound device is configured to drive the first surface to vibrate with respect to the second surface to sound.

11. The vibration sound device of claim 3, wherein the elastic piece and the second housing are bonded by welding or integrally formed.

* * * * *